(12) United States Patent
Kunii et al.

(10) Patent No.: US 6,437,546 B1
(45) Date of Patent: Aug. 20, 2002

(54) DC-TO-DC CONVERTER AND ELECTRONIC DEVICE USING THE SAME

(75) Inventors: Shingo Kunii, Kadoma; Naoto Sano, Otsu, both of (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/981,689

(22) Filed: Oct. 15, 2001

(30) Foreign Application Priority Data

Oct. 30, 2000 (JP) ........................................ 2000-330478

(51) Int. Cl.[7] ................................................. G05F 1/656
(52) U.S. Cl. ........................................ 323/222; 323/284
(58) Field of Search ................................ 323/222, 225, 323/282, 284, 287, 351

(56) References Cited

U.S. PATENT DOCUMENTS

| | | | | | |
|---|---|---|---|---|---|
| 4,210,958 A | * | 7/1980 | Ikenoue | ................... | 323/287 X |
| 5,661,394 A | * | 8/1997 | Nakao et al. | ................ | 323/222 |
| 5,739,679 A | * | 4/1998 | Takehara | ................ | 323/222 X |

* cited by examiner

*Primary Examiner*—Jessica Han
(74) *Attorney, Agent, or Firm*—Ostrolenk, Faber, Gerb & Soffen, LLP

(57) ABSTRACT

A DC-to-DC converter is provided with an astable multivibrator containing a first time constant circuit for setting an ON period of an output and a second time constant circuit for setting an OFF period of the output, and provided with a switching element controlled by the output. The output voltage is controlled by changing the duty ratio of the astable multivibrator in accordance with the output voltage.

28 Claims, 6 Drawing Sheets

DC-TO-DC CONVERTER AND ELECTRONIC DEVICE USING THE SAME

BACKGROUND OF THE INVENTION

1. Field of the Invention

The present invention relates to a DC-to-DC converter and an electronic device using the DC-to-DC converter.

2. Description of the Related Art

FIG. 10 is a circuit diagram of a conventional DC-to-DC converter. In FIG. 10, the DC-to-DC converter comprises a DC power supply Vcc, an inductance element L1, a diode D1 as a rectifying element, a transistor Q1 as a switching element, resistors R1 and R2, capacitors C1 and C2, a drive circuit 2, a reference voltage generating circuit 3, an error amplifier circuit 4, a triangular wave generating circuit 5, a PWM comparator 6, and an output terminal Pout.

The DC power supply Vcc is connected to one end of the inductance element L1, and the other end of the inductance element L1 is connected to the collector of the transistor Q1 and the anode of the diode D1. The cathode of the diode D1 is connected to the output terminal Pout. The emitter of the transistor Q1 is grounded. The capacitor C1 is connected in parallel to the DC power supply Vcc. The capacitor C2 is coupled between output terminal Pout and ground. The output terminal Pout is grounded through a series circuit comprising the resistor R1 and the resistor R2 in this order. The connection point of the resistors R1 and R2 is connected to one input terminal of the error amplifier circuit 4. The reference voltage generating circuit is connected to the other input terminal of the error amplifier circuit 4. The output of the error amplifier circuit 4 is connected to one input terminal of the PWM comparator 6. The triangular wave generating circuit 5 is connected to the other input terminal of the PWM comparator 6. The output terminal of the PWM comparator 6 is connected to the drive circuit 2, and the output terminal of the drive circuit 2 is connected to the base of the transistor Q1.

The DC-to-DC converter 1 constructed in this way is a step-up DC-to-DC converter, and the transistor Q1 is subjected to on-off control by the drive circuit 2. The current flowing through the inductance element L1 is controlled by the transistor Q1. That is, while the transistor Q1 is turned on, the energy of the DC power supply Vcc is charged in the inductance element L1, and, while the transistor Q1 is turned off, the energy is discharged through the diode D1 and output from the output terminal Pout. The value of the output voltage to be output from the output terminal Pout is determined by the ratio between an ON period and an OFF period of the transistor Q1.

The control of the output voltage is described with reference to FIG. 11. If the ratio between the ON period and the OFF period of the transistor Q1 is constant, the output voltage of the DC-to-DC converter 1 varies when the voltage of the DC power supply Vcc and the load connected to the output terminal Pout changes. Therefore, control is required so that the output voltage may not vary even when the voltage of the DC power supply Vcc and the load change. The output voltage is detected by using the resistors R1 and R2 and is input to the error amplifier circuit 4. A reference voltage generated in the reference voltage generating circuit 3 is input to the error amplifier circuit 4, and an error output a in accordance with the difference between them is output. The higher the output voltage, the higher the error output a. The error output a is input to the PWM comparator 6. The triangular wave output b output from the triangular wave generating circuit 5 is input to the PWM comparator 6, and, comparing both, the PWM comparator 6 outputs a comparison output c that, when the error output a is higher, the comparison output c becomes a LOW level and, when the triangular wave output b is higher, the comparison output c becomes a HIGH level. The time dependence of the error output a, the triangular wave output b and the comparison output c is as shown in FIG. 11, and their relationship is such that the higher the error output a, the longer the period where the error output a is higher than the triangular wave output b, and the duty ratio of the comparison output c decreases. In contrast with this, the lower the error output a, the shorter the period where the error output a is higher than the triangular wave output b, and the duty ratio of the comparison output c increases. The comparison output c is input to the drive circuit 2, and determines the duty ratio in the on-off control of the transistor Q1 by the drive circuit 2. The output voltage increases when the duty ratio becomes larger and the ON period of the transistor Q1 is lengthened, and the output voltage decreases when the ON period is shortened. In this way, when the output voltage becomes higher, the duty ratio in on-off control of the transistor Q1 becomes smaller to decrease the output voltage, and, on the contrary, when the output voltage becomes lower, the duty ratio becomes larger to increase the output voltage, and accordingly the output voltage is controlled to maintain a fixed value.

In the DC-to-DC converter 1 shown in FIG. 10, because the error amplifier circuit 4, the triangular wave generating circuit 5, the PWM comparator 6, etc., are included, the size of the circuit becomes large and a problem occurs in that reduction in cost becomes difficult. Furthermore, since the size of the circuit is large, the DC-to-DC converter is often assembled by using ICs, and in that case, as the size increases and the cost rises, there is a problem in that reduction in cost and also reduction in size becomes difficult.

SUMMARY OF THE INVENTION

It is an object of the present invention to solve the above problems and to provide a DC-to-DC converter in which size and cost can be reduced, and an electronic device using the DC-to-DC converter.

In order to attain the above and other objects, a DC-to-DC converter of the present invention comprises an astable multivibrator provided with a first time constant circuit for setting an OFF period of an output and a second time constant circuit for setting an ON period of the output; a switching element controlled by the output of the astable multivibrator; a rectifying element connected to the switching element and an output voltage control circuit for controlling the output voltage such that at least either an ON period or an OFF period of the switching element is changed by changing the time constant of either the first time constant circuit or the second time constant circuit in accordance with the output voltage.

Furthermore, in a DC-to-DC converter of the present invention, an inductance element for charging and discharging energy is provided in series with the switching element.

Furthermore, in a DC-to-DC converter of the present invention, at least one of the first and second time constant circuits is provided with a variable impedance circuit for changing the time constant.

Furthermore, in a DC-to-DC converter of the present invention, a totem-pole circuit is provided between the output of the astable multivibrator and the switching element.

Furthermore, in a DC-to-DC converter of the present invention, the rectifying element is a rectifying switching element, and the astable multivibrator is provided with a first output for on-off controlling the switching element and a second output which is reversed with respect to the first output and which causes the rectifying switching element to turne on while the switching element is turned off.

Furthermore, in a DC-to-DC converter of the present invention, the rising edge of the first and second output waves is tilted or sloped such that the switching element and the rectifying switching element are alternately turned on with periods before being turned on when both elements are turned off.

Furthermore, in a DC-to-DC converter of the present invention, a totem-pole circuit is provided between the output of the astable multivibrator and the rectifying switching element.

Furthermore, in a DC-to-DC converter of the present invention, the rectifying switching element may comprise a MOSFET.

Furthermore, in a DC-to-DC converter of the present invention, the switching element may comprise a MOSFET.

Furthermore, in an electronic device of the present invention, one of the above-described DC-to-DC converters is used.

In a thus constructed DC-to-DC converter of the present invention, reduction in size and cost can be realized with a simple circuit.

Furthermore, in an electronic device of the present invention, reduction in size and cost can be realized with a simple circuit.

BRIEF DESCRIPTION OF THE DRAWING(S)

DETAILED DESCRIPTION OF EMBODIMENTS OF THE INVENTION

Figure 1:
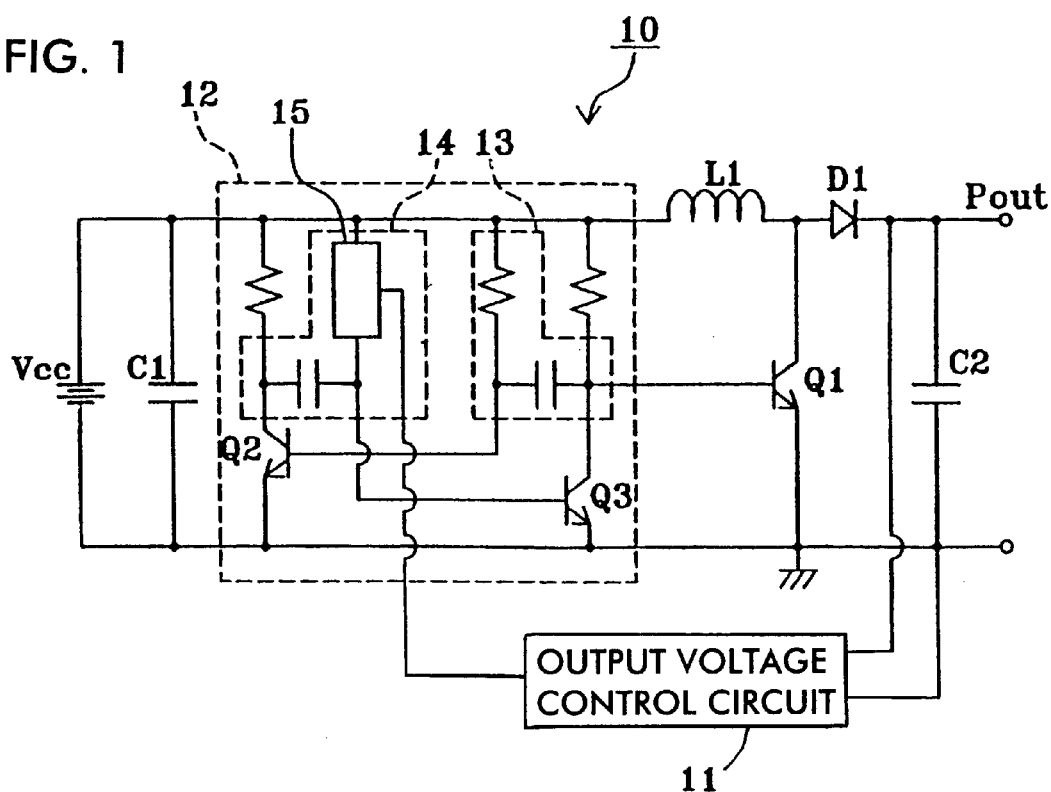
FIG. 1 is a circuit diagram of a DC-to-DC converter according to an embodiment of the present invention.

FIG. 1 is a circuit diagram of a DC-to-DC converter according to an embodiment of the present invention. In FIG. 1, the same reference numerals are assigned to the same or equivalent portions as in FIG. 10, and their description is omitted.

Figure 10:
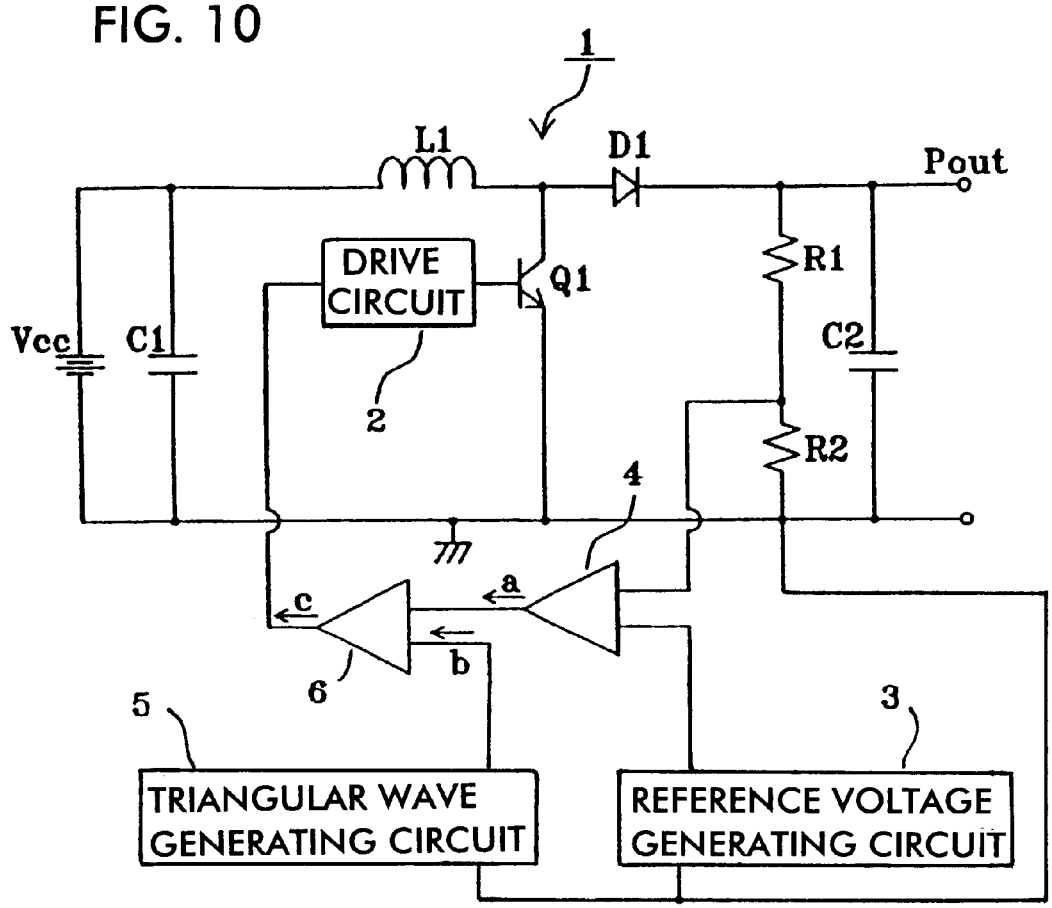
FIG. 10 is a circuit diagram of a conventional DC-to-DC converter.
Figure 11:
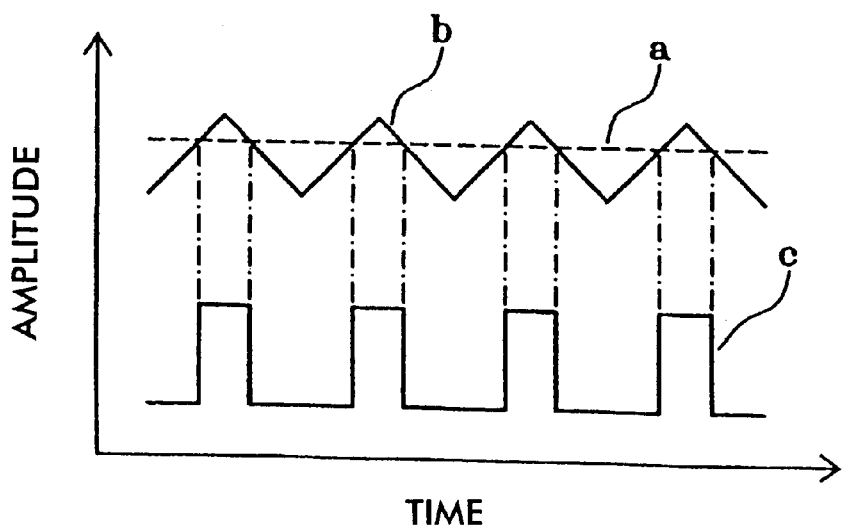
FIG. 11 shows the time dependence of a signal in each part in the DC-to-DC converter in FIG. 10.

In FIG. 1, the DC-to-DC converter 10 is provided with an output voltage control circuit 11 and an astable multivibrator 12 instead of the drive circuit 2, the reference voltage generating circuit 3, the error amplifying circuit 4, the triangular wave generating circuit 5, the PWM comparator 6, and the resistors R1 and R2 shown in FIG. 10. The astable multivibrator 12 comprises a transistor Q2, a first time constant circuit 13 formed of a resistor and a capacitor, which determines the OFF-period of the transistor Q2, a transistor Q3, and a second time constant circuit 14 comprising a variable impedance circuit 15 and a capacitor, which determines the OFF period of the transistor Q3. The collector of the transistor Q3 is connected to the base of a transistor Q1 as a switching element and is made the output terminal of the astable multivibrator 12. Then, an output voltage control circuit 11 is connected to the variable impedance circuit 15.

Figure 2:
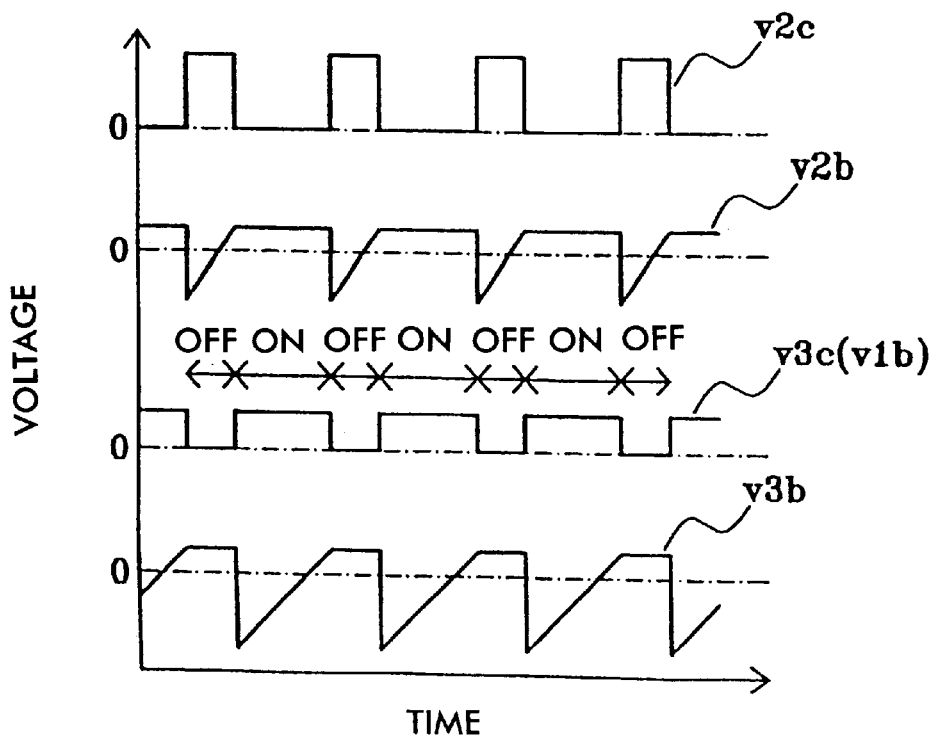
FIG. 2 shows the time dependence of the collector voltage and base voltage of two transistors in an astable multivibrator used in the DC-to-DC converter in FIG. 1.

In the DC-to-DC converter 10 constructed in this way, the astable multivibrator 12 generates a frequency with a duty ratio which is determined by the first and second time constant circuits 13 and 14. The time dependence of the collector voltage v2c and the base voltage v2b of the transistor Q2 and the collector voltage v3c and the base voltage v3b of the transistor Q3 in the astable multivibrator 12 is shown in FIG. 2. Moreover, the collector voltage v3c of the transistor Q3 is also the base voltage v1b of the transistor Q1. As shown in FIG. 2, the transistors Q2 and Q3 are alternately turned on and off in accordance with the OFF periods determined by the first and second time constant circuits 13 and 14. The collector of the transistor Q3 is the output of the astable multivibrator 13, and, while the transistor Q3 is turned on, that is, while the transistor Q2 is turned off, the output becomes a LOW level, and, while the transistor Q3 is turned off, that is, while the transistor Q2 is turned on, the output becomes a HIGH level. Therefore, the astable multivibrator 12 oscillates so as to have an OFF period determined by the first time constant circuit 13 and an ON period determined by the second time constant circuit 14, and the multivibrator 12 drives the transistor Q1. In this way, the transistor Q1 is subjected to the ON-OFF control and the DC-to-DC converter 10 operates.

The control of output voltage of the DC-to-DC converter 10 will now be described. In the DC-to-DC converter, the output voltage control circuit 11 detects an output voltage, outputs a signal showing that the output voltage is higher or lower than a fixed voltage by comparing the output to an internal reference voltage, and inputs the signal into the variable impedance circuit 15. The variable impedance circuit 15 changes its impedance in accordance with the signal from the output voltage control circuit 11. In a concrete way, for example, when the output voltage of the DC-to-DC converter 10 is higher than a fixed voltage, the output voltage control circuit 11 operates so as to reduce the impedance of the variable impedance circuit 15. Since the variable impedance circuit 15 is a component of the second time constant circuit 14 determining the OFF period of the transistor Q3, the time constant of the second time constant circuit 14 decreases and the OFF period of the transistor Q3 is shortened. The shorter OFF period of the transistor Q3 means a shorter ON period of the transistor Q1. At this time, since there is no alteration of the OFF period of the transistor Q2, the OFF period of the transistor Q1 is not changed. As a result, the ratio of the ON period to the sum of the ON period and the OFF period of the transistor Q1, that is, the duty ratio, decreases to lower the output voltage. On the contrary, when the output voltage of the DC-to-DC converter 10 is lower than a fixed voltage, the impedance of the variable impedance circuit 15 increases, the OFF period of transistor Q3 increases and the duty ratio of the transistor Q1 increases so as to increase the output. Thus, the DC-to-DC converter 10 is controlled so that the output voltage may be a fixed voltage.

Figure 3:
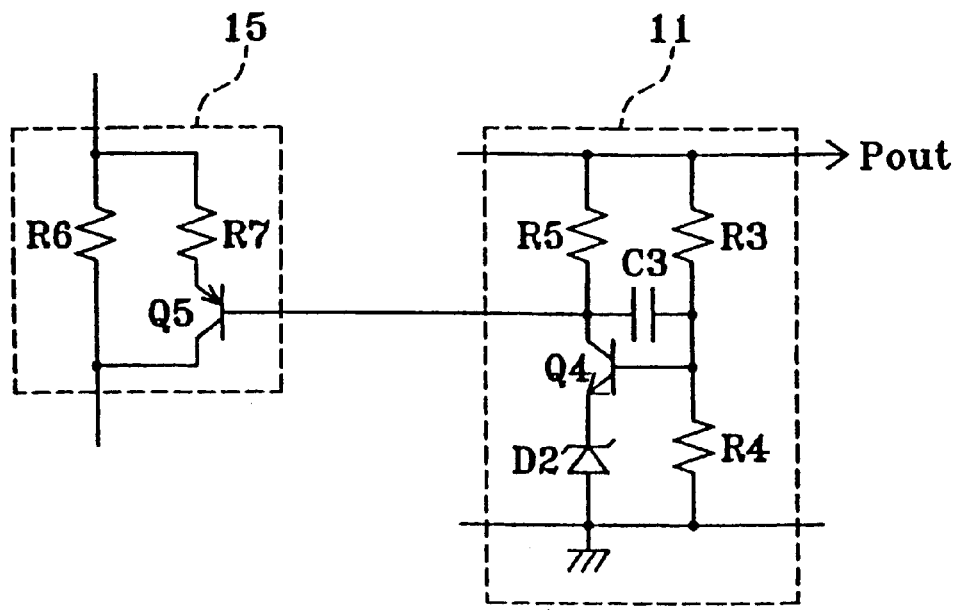
FIG. 3 is a circuit diagram showing concrete examples of an output voltage control circuit and a variable impedance circuit in the DC-to-DC converter in FIG. 1.

Examples of concrete circuits of the output voltage control circuit 11 and the variable impedance circuit 15 are shown in FIG. 3. In FIG. 3, the output voltage control circuit 11 comprises resistors R3, R4, and R5, a transistor Q4, a Zener diode D2, and a capacitor C3. The resistors R3 and R4 are connected in series between the output terminal Pout of the DC-to-DC converter 10 and ground. The resistor R5, the transistor Q4, and the Zener diode D2 are also connected in series between the output terminal Pout and the ground. The connection point of the resistors R3 and R4 is connected to the base of the transistor Q4. The capacitor C3 is connected between the connection point of the resistors R3 and R4 and the collector of the transistor Q4. The collector of the transistor Q4 is provided as the output terminal of the output voltage control circuit 11. Furthermore, the variable impedance circuit 15 comprises a resistor R6 and a series circuit of a resistor R7 and a transistor Q5, which is connected in parallel to the resistor R6. The base of the transistor Q5 functions as the control terminal of the variable impedance circuit 15, and is connected to the output terminal of the output voltage control circuit 11.

In the output voltage control circuit 11 and the variable impedance circuit 15 constructed in this way, the output voltage of the DC-to-DC converter 10, which is divided by the resistors R3 and R4, is detected and input to the base of the transistor Q4. Since the emitter of the transistor Q4 is kept at a fixed voltage by the Zener diode, when the output voltage increases, the base current of the transistor Q4 increases, and accordingly the collector voltage of the transistor Q4 increases; the base voltage of the transistor Q5 in the variable impedance circuit 15 thus is reduced. When the base voltage of the transistor Q5 decreases, the resistance between the emitter and collector of the transistor Q5 is reduced. As a result, the entire resistance of the variable impedance circuit 15, that is, the impedance, decreases. In this way, the output voltage control circuit 11 and the variable impedance circuit 15 operate.

Moreover, the construction of the output voltage control circuit and the variable impedance circuit is not limited to these, and any circuit construction having the same function can be used.

Figure 4:
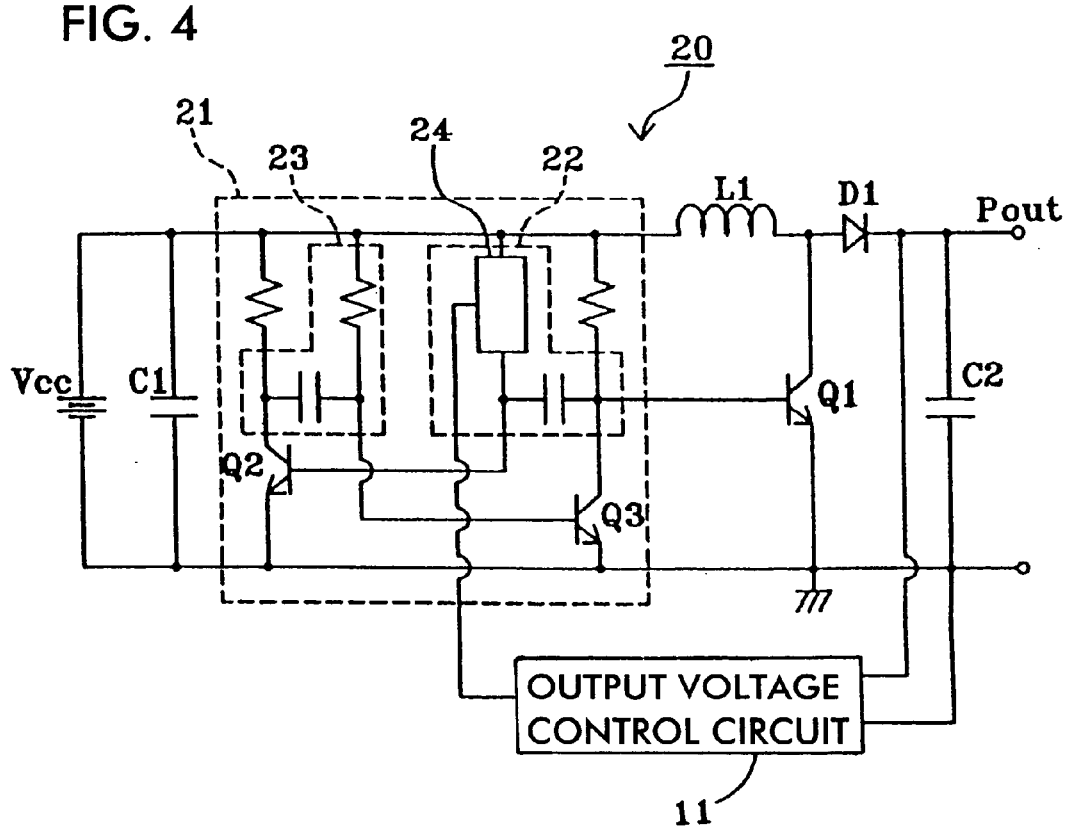
FIG. 4 is a circuit diagram of a DC-to-DC converter according to another embodiment of the present invention.

FIG. 4 is a circuit diagram of a DC-to-DC converter according to another embodiment of the present invention. In the DC-to-DC converter 20 shown in FIG. 4, the same reference numerals are given the same or equivalent portions as in FIG. 1, and their description is omitted.

In FIG. 4, the DC-to-DC converter 20 is provided with an astable multivibrator 21 instead of the astable multivibrator 12 in the DC-to-DC converter 10 shown in FIG. 1. The astable multivibrator 21 comprises a first time constant circuit 22 comprising the transistor Q2, a variable impedance circuit 24, and a capacitor, which determines the OFF period of the transistor Q2, and a second time constant circuit 23 comprising the transistor Q3, a resistor, and a capacitor, which determines the OFF period of the transistor Q3. The output voltage control circuit 11 is connected to the variable impedance circuit 24.

The DC-to-DC converter 20 constructed in this way is different from the DC-to-DC converter 10 only in that the variable impedance circuit 24 is a constituent of the first time constant circuit 22 determining the OFF period of the transistor Q2. Because of that, in the DC-to-DC converter 20, the OFF period of the transistor Q1 changes in accordance with the change of the output voltage and the ON period does not change. Therefore, by altering the ratio of the OFF period to the sum of the ON period and the OFF period of the transistor Q1, that is, the duty ratio, the output voltage is controlled so as to be at a fixed voltage. Moreover, in this case, in contrast with the DC-to-DC converter 10, it is required to construct the variable impedance circuit 24 such that the resistance increases when the output voltage is higher.

Figure 5:
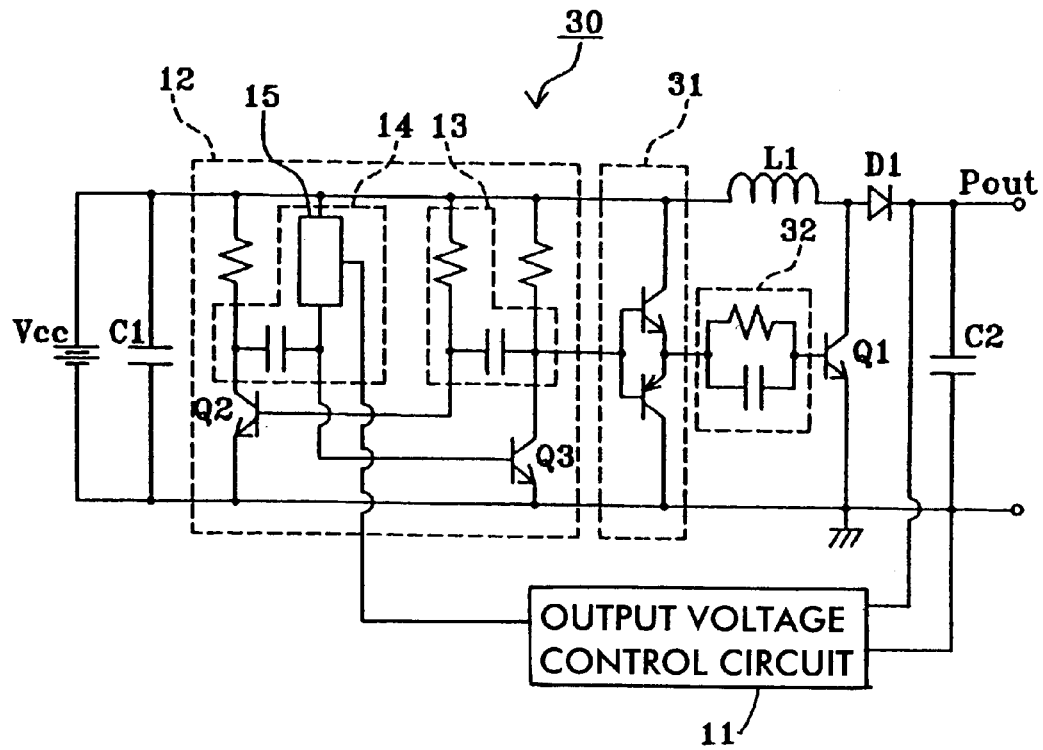
FIG. 5 is a circuit diagram of a DC-to-DC converter according to another embodiment of the present invention.

FIG. 5 is a circuit diagram of a DC-to-DC converter according to another embodiment of the present invention. In the DC-to-DC converter 30 shown in FIG. 4, the same reference numerals are given the same or equivalent portions as in FIG. 1, and their description is omitted.

In FIG. 5, in addition to the construction of the DC-to-DC converter 10 shown in FIG. 1, the DC-to-DC converter 30 is provided with a totem-pole circuit 31 and a speed-up circuit 32 which are connected in series between the output terminal of the astable multivibrator 12, that is, the collector of the transistor Q3 and the base of the transistor Q1, as a switching element.

In the thus constructed DC-to-DC converter 30, the output of the astable multivibrator 12 is input into the totem-pole circuit 31. The totem-pole circuit 31 amplifies the output of the astable multivibrator 12. The amplified output of the astable multivibrator 12 is input to the base of the transistor Q1 as a switching element through the speed-up circuit 32. Thus, the switching speed of the transistor Q1 increases. In this case, the switching speed means the speed when the transistor Q1 in the ON state changes to the OFF state or the transistor Q1 in the OFF state changes to the ON state. When the switching speed of the transistor Q1 increases, the switching loss in the transistor Q1 is reduced. Since the switching loss in the transistor Q1 constitutes the main part of losses in the DC-to-DC converter, the efficiency of the DC-to-DC converter can be improved by reducing the switching loss of the transistor Q1.

Figure 6:
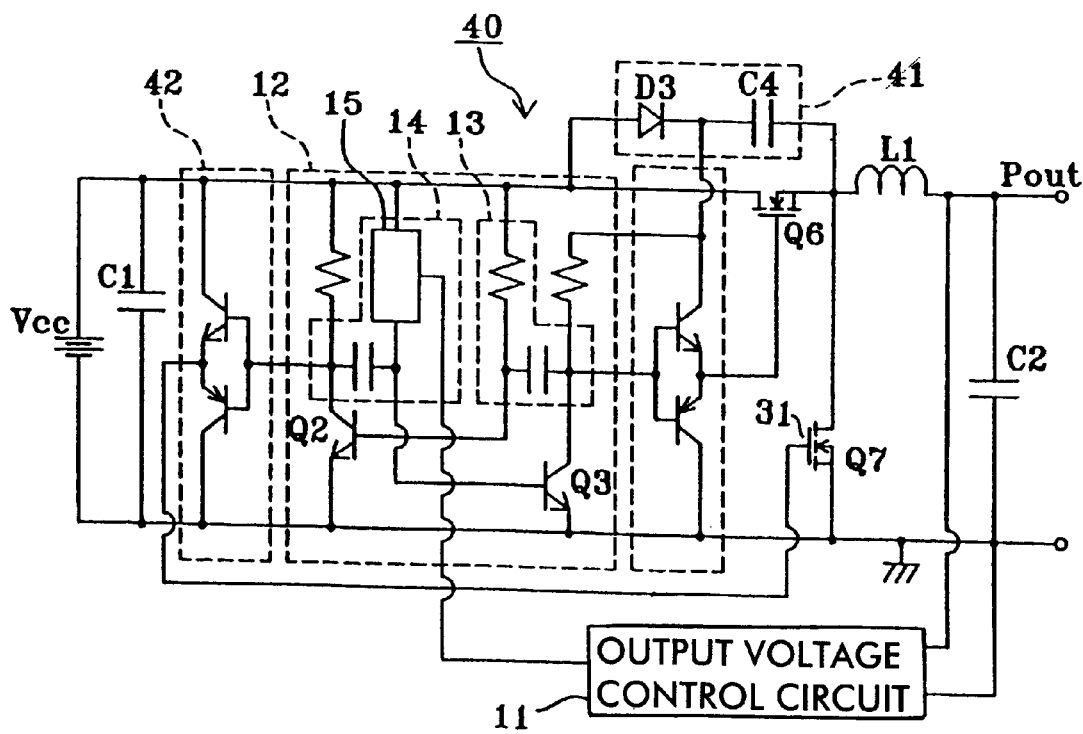
FIG. 6 is a circuit diagram of a DC-to-DC converter according to another embodiment of the present invention.

FIG. 6 is a circuit diagram of a DC-to-DC converter according to another embodiment of the present invention. In the DC-to-DC converter 40 shown in FIG. 6, the same reference numerals are given the same or equivalent portions as in FIG. 5, and their description is omitted.

In FIG. 6, the DC-to-DC converter 40 is a step-down DC-to-DC converter, and is the same as the DC-to-DC converter 30 in FIG. 5, in which the transistor Q1, the diode D1, and the speed-up circuit 32 are removed and in which an FET Q6 as a switching element, an FET Q7 as a rectifying switching element, a bootstrap circuit 41, and a totem-pole circuit 42 are provided.

The FETs Q6 and Q7 are shown as n-channel FETs. The FET Q6 is connected between the DC power supply Vcc and the inductance element L1. The output of the totem-pole circuit 31 is connected to the gate of the FET Q6. The bootstrap circuit 41 formed of a diode D3 and a capacitor C4 is connected between the drain and source of the FET Q6. The collector of an npn transistor as the connection portion of the totem-pole circuit 31 to the power supply is connected to the bootstrap circuit 41, specifically, to the connection point of the diode D3 and the capacitor C4. The connection point of the FET Q6 and the inductance element L1 is coupled to ground through the FET Q7. The collector of the transistor Q2 in the astable multivibrator 12 is connected to the gate of the FET Q7 through the totem-pole circuit 42. Therefore, a first output of the astable multivibrator 12 is output from the collector of the transistor Q3, and a second output of the astable multivibrator 12 is output from the collector of the transistor Q2.

Figure 7:
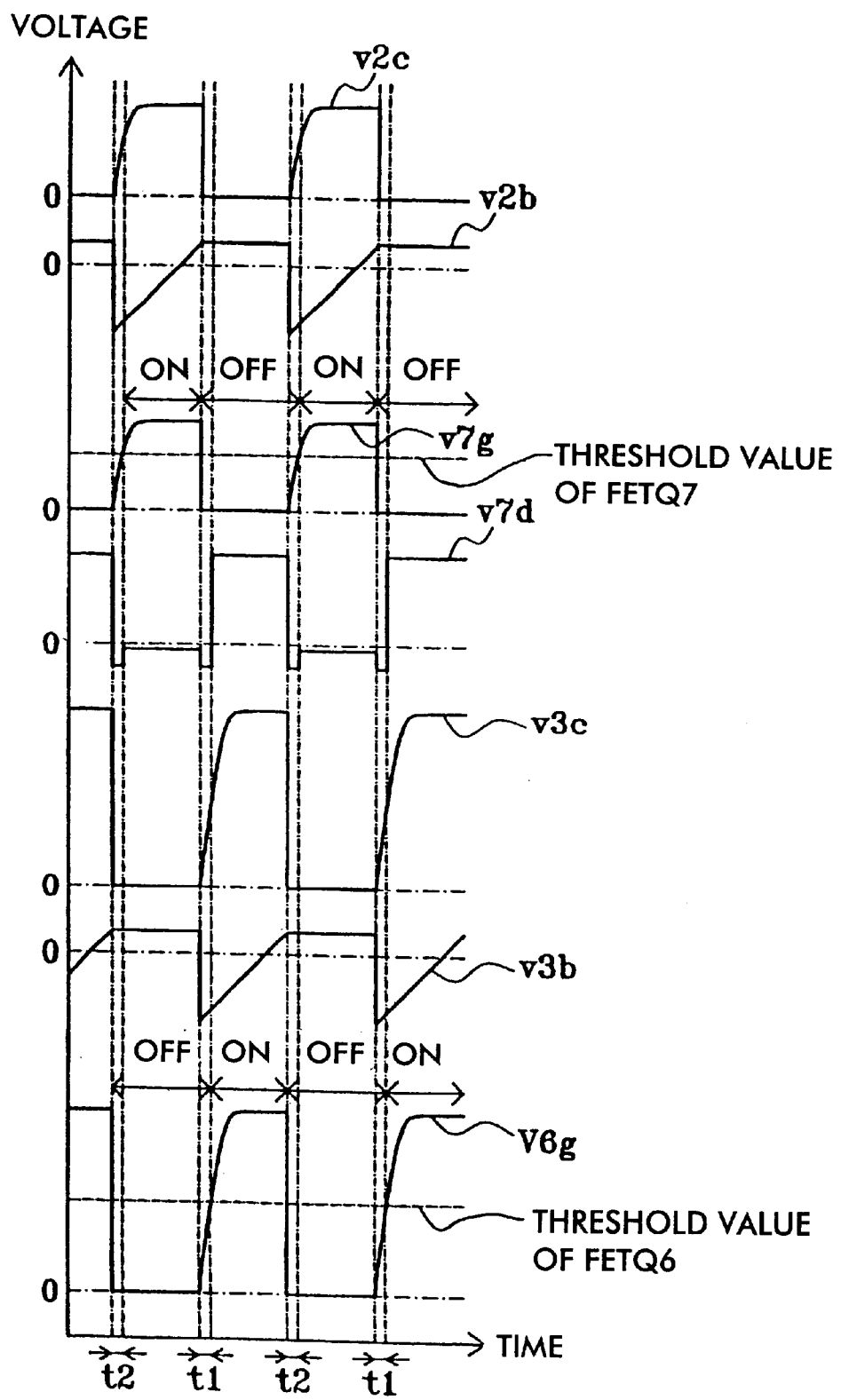
FIG. 7 shows the time dependence of a signal in each part in the DC-to-DC converter in FIG. 6.

The time dependence of the collector voltage v2c and base voltage v2b of the transistor Q2 in the astable vibrator 12, the gate voltage v7g and drain voltage v7d of the FET Q7, the collector voltage v3c and base voltage v3b of the transistor Q3, and the gate voltage v6g of the FET Q6 is shown in FIG. 7, and the operation of the DC-to-DC converter 40 is described with reference to FIG. 7.

In the DC-to-DC converter 40, the two transistors Q2 and Q3 of the astable multivibrator 12 are alternately turned on and off. The collector voltage v2c and base voltage v2b of the transistor Q2, and the collector voltage v3c and base voltage v3b of the transistor Q3 are as shown in FIG. 7. When compared with the case of the DC-to-DC converter 10 shown in FIG. 2, they are different in that the rising edges of the collector voltages v2c and v3c are tilted. The inclination of these tilted edges is determined by the time constant which is dependent on the resistors and capacitors connected to the transistors Q2 and Q3, respectively. That is, the larger the time constant, the larger the inclination. Moreover, also in the case of the DC-to-DC converter 10 shown in FIG. 2, it is not true that they have no inclination, but since the inclination is very steep, they are only illustrated as if they were vertical.

The collector voltage v3c of the transistor Q3 as the first output is input to the totem-pole circuit 31. Since the connection portion, to the power supply, of the totem-pole circuit 31 is connected to the bootstrap circuit 41, the connection portion is stepped up to be higher than the DC power supply Vcc, and a sufficiently high voltage with reference to the source voltage of the FET Q6 is applied to the gate of the FET Q6 from the totem-pole circuit 31. Thus, the FET Q6 is subjected to on-off control and functions as a switching element. At this time, since the rising edge of the collector voltage v3c of the transistor Q3 is tilted, the rising edge of the voltage v6g applied to the gate of the FET Q6 is also tilted. Because of this, it takes a little time before the gate voltage v6g of the FET Q6 reaches a threshold value where the FET Q6 is turned on. Therefore, as shown in FIG. 7, a dead time t1 is produced from the turn-off of the transistor Q7 to the turn-on of the transistor Q6.

On the other hand, the collector voltage v2c of the transistor Q2 as the second output is input to the totem-pole circuit 42. The second output amplified by the totem-pole circuit 42 is applied to the gate of the FET Q7. Thus, the FET Q7 is subjected to on-off control. Since the rising edge of the collector voltage v2c of the transistor Q2 is tilted, the rising edge of the voltage v7g applied to the gate of the FET Q7 is also tilted as shown in FIG. 7. Therefore, it takes a little time before the gate voltage v7g of the FET Q7 reaches a threshold value where the FET Q7 is turned on. As a result, a dead time t2 is produced from the turn-off of the transistor Q6 to the turn-on of the FET Q7.

In this way, the FET Q6 and the FET Q7 are alternately turned on and off before and after the dead times t1 and t2 during which both FET Q6 and FET Q7 are turned off. Moreover, the reason why the dead times t1 and t2 are provided by utilizing the tilted rising edge of the collector voltages v2c and v3c of the transistors Q2 and Q3 is that the DC power supply Vcc is prevented from being short-circuited through the FET Q6 and FET Q7 both being on at the same time.

In this way, since the FET Q7 is turned off while the FET Q6 is turned on, the current flows from the DC power supply Vcc to the output terminal Pout through the FET Q6 and the inductance element L1. Because of this, as shown in FIG. 7, while the FET Q6 is turned on, the drain voltage v7d of the FET Q7, that is, the source voltage of the FET Q6 becomes substantially the same as the DC power supply Vcc.

On the other hand, since the FET Q7 is turned on while the FET Q6 is turned off, because of the excitation energy stored in the inductance element L1, a current flows to the output terminal Pout through the FET Q7 and the inductance element L1. That is, the FET Q7 functions as a synchronous rectifier circuit element which makes a current flow in one direction in synchronization with the switching of the FET Q6. Therefore, as shown in FIG. 7, while the FET Q6 is turned off, the source voltage of the FET Q6, that is, the drain voltage v7d of the FET Q7 has a negative potential which is a little lower than the ground potential.

Also in the dead time t1 from the turn-off of the FET Q6 to the turn-on of the FET Q7 and the dead time t2 from the turn-off of the FET Q7 to the turn-on of the FET Q6, it is necessary to pass a current through the inductance element L1, but, since the FET Q7 as a MOSFET contains a body diode, a current flows from the ground to the output terminal Pout through the body diode. The value of the drain voltage v7d of the FET Q7 in the ON period of the FET Q7 is different from in the dead times t1 and t2, but this is because the voltage drop when the current flows through the body diode is larger than that when the current flows through the FET Q7 in the ON state.

In the thus constructed DC-to-DC converter 40 according to the present invention, the synchronous rectifying circuit is constructed by using one of the two outputs of the astable multivibrator 12, as a first output for switching the FET Q6 as a switching element and by using the other as a second output for switching the FET Q7 as a rectifying switching element. Therefore, since it is not necessary to use expensive control ICs for controlling the rectifying switching element, less expensive DC-to-DC converters of a synchronous rectifier operation mode can be realized. Furthermore, because no space for mounting controlling ICs, etc., is required, the circuit board, and in turn, the DC-to-DC converter itself can be made smaller. Low loss characteristics of the synchronous rectifier circuit can be also realized.

Figure 8:
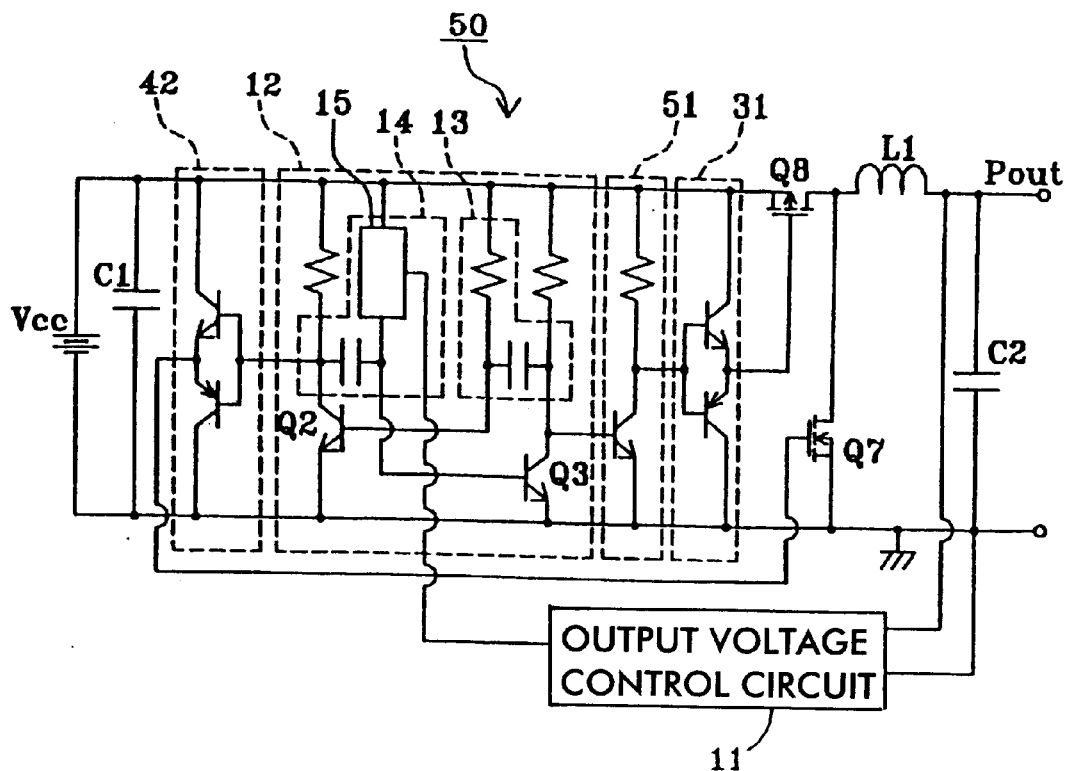
FIG. 8 is a circuit diagram of a DC-to-DC converter according to another embodiment of the present invention.

FIG. 8 is a circuit diagram of a DC-to-DC converter according to another embodiment of the present invention. In the DC-to-DC converter 50 shown in FIG. 8, the same reference numerals are assigned to the same or equivalent portions as in FIG. 6, and their description is omitted.

The DC-to-DC converter 50 shown in FIG. 8 is the same as the DC-to-DC converter in FIG. 6, in which the bootstrap circuit 41 is removed, an FET Q8 which is a p-channel MOSFET is provided instead of the FET Q6, and a logical inversion circuit 51 is provided between the first output terminal of the astable multivibrator 12 and the totem-pole circuit 31. Furthermore, the collector of the npn transistor as the connection portion, to the power supply, of the totem-pole circuit 31 is connected to the DC power supply Vcc.

In the DC-to-DC converter 50, since the switching element is replaced with an FET Q8 as a p-channel MOSFET, it is not required to make the gate voltage of the FET Q8 higher than the source voltage, and accordingly the bootstrap circuit 41 became unnecessary. Instead, since the logic of turn-on and turn-off of a signal to be applied to the gate of the FET Q8 is inverted from that of the FET Q6, a logical inversion circuit 51 is required to invert the logic of the first output in accordance with the new logic.

The thus constructed DC-to-DC converter 50 operates substantially in the same way as the DC-to-DC converter 40, and produces the same effect.

Moreover, each of the above-described embodiments was constructed so as to control the output voltage by changing either the first time constant circuit or the second time constant circuit, but, for example, by reducing the time constant of the second time constant circuit when the time constant of the first time constant circuit was increased, etc., they may be constructed to control the output voltage by changing the time constant of both first and second time constant circuits and the same effect can be produced. Furthermore, the sum of an ON period and an OFF period of the switching element is made substantially constant by changing both time constants, that is, the output voltage can be controlled in such a state that the switching frequency of the switching element is substantially constant.

Furthermore, in each of the above-described embodiments, the construction in which an astable multivibrator is used in step-up and step-down DC-to-DC converter circuits is described, but the construction of DC-to-DC converters is not limited to the step-up and step-down types and any circuit construction such as reverse types, etc., may be used as long as a DC voltage is input and a DC voltage is output, and then the same effect can be produced as in the step-up and step-down types.

Furthermore, in each of the above-described embodiments, a DC-to-DC converter circuit provided with an inductance element is described, but a DC-to-DC converter circuit provided with no inductance element, that is, a charge-pump circuit, etc., may be used, and the same effect can be produced.

Figure 9:
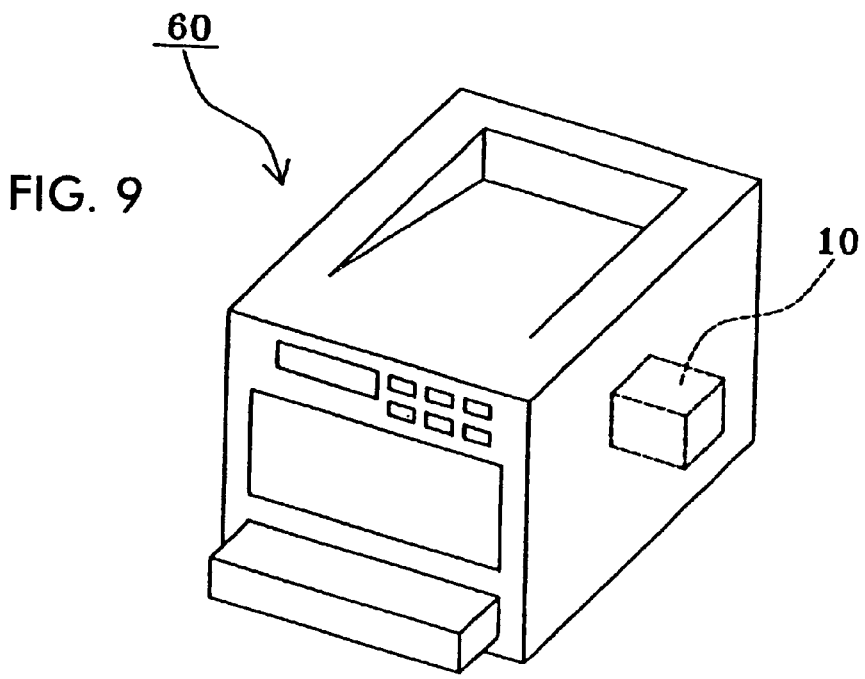
FIG. 9 is a perspective view of an electronic device according to another embodiment of the present invention.

FIG. 9 is a perspective view of an electronic device according to the present invention. In FIG. 9, a printer 60 as an electronic device uses the DC-to-DC converter 10 of the present invention in part of the power supply circuit.

In this way, since the switching power-supply circuit can be made smaller and cheaper by using the DC-to-DC converter 10 of the present invention, the printer 60 can be made smaller and cheaper.

Moreover, in the printer 60 shown in FIG. 9, the DC-to-DC converter in FIG. 10 is used, but the DC-to-DC converters 20, 30, 40, and 50 shown in FIGS. 4, 5, 6, and 8 may be used and the same effect can be produced.

Furthermore, the electronic equipment according to the present invention is not limited to a printer, but all types of electronic equipment such as notebook PCs, portable information equipment, etc., where a DC power supply having a stable voltage output is required are included.

According to a DC-to-DC converter of the present invention, the circuit construction is simplified such that a switching element is controlled by using an astable multivibrator provided with a first time constant circuit setting an OFF period and a second time constant circuit setting an ON period, and such that the output voltage is controlled by changing at least one time constant of the first and second time constant circuits in accordance with the output voltage, and accordingly a smaller and cheaper DC-to-DC converter can be obtained.

Furthermore, by constructing a synchronous rectifying circuit in which a switching element and a rectifying switching element are controlled by first and second outputs, which are reversed in opposite direction to each other, an astable multivibrator can be obtained.

Furthermore, according to an electronic device of the present invention, it can be smaller and cheaper by using a DC-to-DC converter of the present invention.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. A DC-to-DC converter in which an output voltage is set by changing the value of an input voltage, the converter comprising:

an astable multivibrator provided with a first time constant circuit for setting an OFF period of an output and a second time constant circuit for setting an ON period of the output;

a switching element controlled by the output of the astable multivibrator; and a rectifying element connected to the switching element; and an output voltage control circuit for controlling the output voltage such that at least either an ON period or an OFF period of the switching element is changed by changing a time constant of either the first time constant circuit or the second time constant circuit in accordance with the output voltage.

2. The DC-to-DC converter of claim 1, wherein an inductance element for charging and discharging energy is provided in series with the switching element.

3. The DC-to-DC converter of claim 1, wherein at least one of the first and second time constant circuits is provided with a variable impedance circuit for changing the time constant.

4. The DC-to-DC converter of claim 1, wherein a totempole circuit is provided between the output of the astable multivibrator and the switching element.

5. The DC-to-DC converter of claim 1, wherein the rectifying element is a rectifying switching element, and wherein the astable multivibrator is provided with a first output for on-off controlling the switching element and a second output which is reversed with respect to the first output and which causes the rectifying switching element to turn on while the switching element is turned off.

6. The DC-to-DC converter of claim 5, wherein a rising edge of the first and second output waveforms is sloped such that the switching element and the rectifying switching element are alternately turned on with periods before being turned on when both switching elements are off.

7. The DC-to-DC converter of claim 5, wherein a totempole circuit is provided between the output of the astable multivibrator and the rectifying switching element.

8. The DC-to-DC converter of claim 5, wherein the rectifying switching element is a MOSFET.

9. The DC-to-DC converter of claim 5, further comprising an inverter circuit coupled to one output of the a stable multivibrator and wherein the switching element and rectifying switching element are complementary type transistors.

10. The DC-to-DC converter of claim 5, wherein an inductance element for charging and discharging energy is provided in series with the rectifying element.

11. The DC-to-DC converter of claim 5, wherein the rectifying switching element is coupled across an inductance and a load coupled to an output of the converter.

12. The DC-to-DC converter of claim 5, wherein the switching element is coupled in series with the inductance to the load.

13. The DC-to-DC converter of claim 12, further comprising a bootstrap circuit coupled across the switching element.

14. The DC-to-DC converter of claim 1, wherein the switching element is a MOSFET.

15. An electronic device including a DC-to-DC converter, the DC-to-DC converter comprising:
- an astable multivibrator provided with a first time constant circuit for setting an OFF period of an output and a second time constant circuit for setting an ON period of the output;
- a switching element controlled by the output of the astable multivibrator; and
- a rectifying element connected to the switching element; and
- an output voltage control circuit for controlling the output voltage such that at least either an ON period or an OFF period of the switching element is changed by changing a time constant of either the first time constant circuit or the second time constant circuit in accordance with the output voltage.

16. The electronic device of claim 15, wherein an inductance element for charging and discharging energy is provided in series with the switching element.

17. The electronic device of claim 15, wherein at least one of the first and second time constant circuits is provided with a variable impedance circuit for changing the time constant.

18. The electronic device of claim 15, wherein a totempole circuit is provided between the output of the astable multivibrator and the switching element.

19. The electronic device of claim 15, wherein the rectifying element is a rectifying switching element, and wherein the astable multivibrator is provided with a first output for on-off controlling the switching element and a second output which is reversed with respect to the first output and which causes the rectifying switching element to turn on while the switching element is turned off.

20. The electronic device of claim 19, wherein a rising edge of the first and second output waveforms is sloped such that the switching element and the rectifying switching element are alternately turned on with periods before being turned on when both switching elements are off.

21. The electronic device of claim 19, wherein a totempole circuit is provided between the output of the astable multivibrator and the rectifying switching element.

22. The electronic device of claim 19, wherein the rectifying switching element is a MOSFET.

23. The electronic device of claim 19, further comprising an inverter circuit coupled to one output of the a stable multivibrator and wherein the switching element and rectifying switching element are complementary type transistors.

24. The electronic device of claim 19, wherein an inductance element for charging and discharging energy is provided in series with the rectifying element.

25. The electronic device of claim 19, wherein the rectifying switching element is coupled across an inductance and a load coupled to an output of the converter.

26. The electronic device of claim 19, wherein the switching element is coupled in series with the inductance to the load.

27. The electronic device of claim 26, further comprising a bootstrap circuit coupled across the switching element.

28. The electronic device of claim 15, wherein the switching element is a MOSFET.

* * * * *